(12) United States Patent
Chan

(10) Patent No.: US 10,606,368 B1
(45) Date of Patent: Mar. 31, 2020

(54) METHOD FOR DYNAMICALLY ADJUSTING A KEYBOARD OUTPUT SIGNAL

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 0 days.

(21) Appl. No.: 16/169,845

(22) Filed: Oct. 24, 2018

(51) Int. Cl.
*G06F 3/02* (2006.01)
*H01H 13/7065* (2006.01)

(52) U.S. Cl.
CPC ....... *G06F 3/0202* (2013.01); *H01H 13/7065* (2013.01)

(58) Field of Classification Search
CPC .......... G06F 3/02; G06F 3/0202; G06F 3/023; G06F 3/0238; G06F 3/0489; G06F 3/04895; H01H 13/70; H01H 13/7065
See application file for complete search history.

(56) References Cited

U.S. PATENT DOCUMENTS

| | | | | |
|---|---|---|---|---|
| 5,105,381 A * | 4/1992 | Takahashi | ............ | G06F 17/274 715/210 |
| 5,867,729 A * | 2/1999 | Swonk | .................... | G06F 3/023 345/172 |
| 2002/0063691 A1 * | 5/2002 | Rogers | .................. | G06F 3/0219 345/168 |
| 2003/0189551 A1 * | 10/2003 | Olsen | .................... | G06F 3/0238 345/168 |
| 2004/0104893 A1 * | 6/2004 | Huang | .................. | G06F 3/0219 345/168 |
| 2005/0022165 A1 * | 1/2005 | Ruff | ...................... | G06F 9/4403 717/121 |
| 2005/0288064 A1 * | 12/2005 | Lin | ........................ | G06F 3/0238 455/564 |
| 2009/0089394 A1 * | 4/2009 | Krueger | .................. | G06F 15/16 709/216 |
| 2011/0084904 A1 * | 4/2011 | Tan | ........................ | G06F 3/0238 345/163 |
| 2018/0024646 A1 * | 1/2018 | Chan | ..................... | G06F 3/0227 345/172 |

* cited by examiner

*Primary Examiner* — Joe H Cheng
(74) *Attorney, Agent, or Firm* — Maschoff Brennan

(57) ABSTRACT

A method for dynamically adjusting a keyboard output signal that is applicable to a host that is electrically connected to a keyboard. The method includes: detecting an application currently running by the host, wherein the application is in a foreground window, and obtaining a function key configuration file corresponding to the application, intercepting one of the standard key codes generated by pressing a function key, and outputting a custom key code combination to the host according to the standard key code and the function key configuration file.

12 Claims, 4 Drawing Sheets

METHOD FOR DYNAMICALLY ADJUSTING A KEYBOARD OUTPUT SIGNAL

BACKGROUND

Technical Field

The present disclosure is related to a method for adjusting a keyboard output signal, in particular to a method for adjusting a keyboard output signal according to a foreground application.

Related Art

As the computing speed of computers increases, users can execute more applications at the same time. In order to switch or operate smoothly between multiple applications, it is more convenient to use the keyboard to switch or operate the applications than by using the mouse to select the icons on the screen. Generally, the keyboard includes a typing key area, a specific function area, a numeric keypad, and an editing keypad; wherein the function keys (Function Key, F1 key to F12 key) located in the specific function area have provided the functions which printed on the key cap, such as renaming, searching, rearranging, etc. However, in order to meet the needs of different users for speed operation of the application, the user prefers to be able to customize or expand the quick operation items operated by the function keys. There are also a variety of software available on the market for users to define their own function keys for quick operation.

However, as users execute more and more applications at the same time, such as office software, multimedia players, web browsers, games, etc., the limited number of function keys limits the new features that can be added, so that users have to spend extra time to make trade-offs in settings, such as considering quick-action items to be set for each function key, and even remembering which applications correspond to which quick function keys. Once a new application is installed, the user may have to switch to the application and be forced to modify the previously set script file. Repeating the button setting and reloading one of the multiple script files that have been set up undoubtedly bring a lot of inconvenience and trouble to the user. Furthermore, when the user needs to execute an application, because the user may easily forget the contents of the shortcut key set at the time of the last operation, the benefit of the function of changing the button to provide a quick start or input instruction is not noticeable. In general, because the user has different setting requirements for the shortcut keys for each application, it is more prominent that the number of quick operation items available for the existing function keys on the keyboard is insufficient.

SUMMARY

In view of this, the present disclosure is to provide a method of dynamically adjusting the keyboard output signal, thereby solving the various inconveniences mentioned above.

A method for dynamically adjusting a keyboard output signal according to an embodiment of the present disclosure is applicable to a host that is electrically connected to a keyboard. The method includes: detecting an application currently running by the host, wherein the application is in a foreground window; in the function key configuration file correspond to the application, the function key configuration file is a preset configuration file or a custom configuration file; blocking one of the standard key codes generated by pressing a function key, wherein the function key includes at least an F1 key to an F12 key; according to the standard key code and function key configuration file, the custom key code combination is output to the host.

A method for dynamically adjusting a keyboard output signal according to an embodiment of the present disclosure, wherein before detecting an application currently running by the host, the method further comprises: obtaining a hardware identification code of the keyboard, the hardware identification code includes the product identification code and the identification code; and confirming whether the hardware identification code exists in the identification code list; and the detecting process further comprises: detecting the application when the hardware identification code exists in the identification code list. After confirming that the hardware identification code exists in the identification code list, the method further includes: confirming the configuration file list corresponding to the hardware identification code; and confirming whether the configuration file list has a custom configuration file corresponding to the application; when the configuration file list has a custom configuration file corresponding to the application, the custom configuration file is used as the function key configuration file; otherwise, the default configuration file in the configuration file list is used as the function key configuration file.

A method for dynamically adjusting a keyboard output signal according to an embodiment of the present disclosure further includes outputting a scan key code before outputting the custom key code combination. The custom combination key code is used to execute shortcuts, applications or hyperlinks, or to output images, strings, commands, macros, single button signals or composite button signals. After obtaining the function key configuration file corresponding to the application, the method further includes: presenting the name of the function key and the custom key code combination of the corresponding function key on a display device.

In summary, the method for dynamically adjusting the keyboard output signal disclosed by the present disclosure achieves the following functions by an embedded program that can be executed in the background of the operating system: the user can define the operation items of the function keys, and save the custom operation items. A set of custom function key profiles and automatic detection of the current application provide a function key profile for the current application. The user only needs to use a one-time setting, followed by the automatic detection and switching mechanism provided by the embedded program, and can use the preset or custom function keys on the designated keyboard as desired, or click on the screen to achieve the action item assigned to the function key.

The above description of the disclosure and the following description of the embodiments of the present disclosure are intended to illustrate and explain the spirit and principles of the invention, and can give a further explain of the present disclosure.

BRIEF DESCRIPTION OF THE DRAWINGS

The present disclosure will become more fully understood from the detailed description given here in below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for dynamically adjusting the keyboard output signal described in an embodiment of the present disclosure is implemented by an embedded program running on the host electrically connected to the designated keyboard. The embedded program is, for example, a driver that has been built into the computer or an application software that needs to be installed initially. The installation method is, for example, installation via a CD, and USB OTG (on-the-go) through the keyboard, or download and install from the original website, or download and install in the form of APP (application). After installing this embedded program, you can match the specified keyboard and dynamically adjust the keyboard output signal according to the current application. The various steps in the method of dynamically adjusting the keyboard output signal of the present disclosure will be described in detail later.

Figure 1:
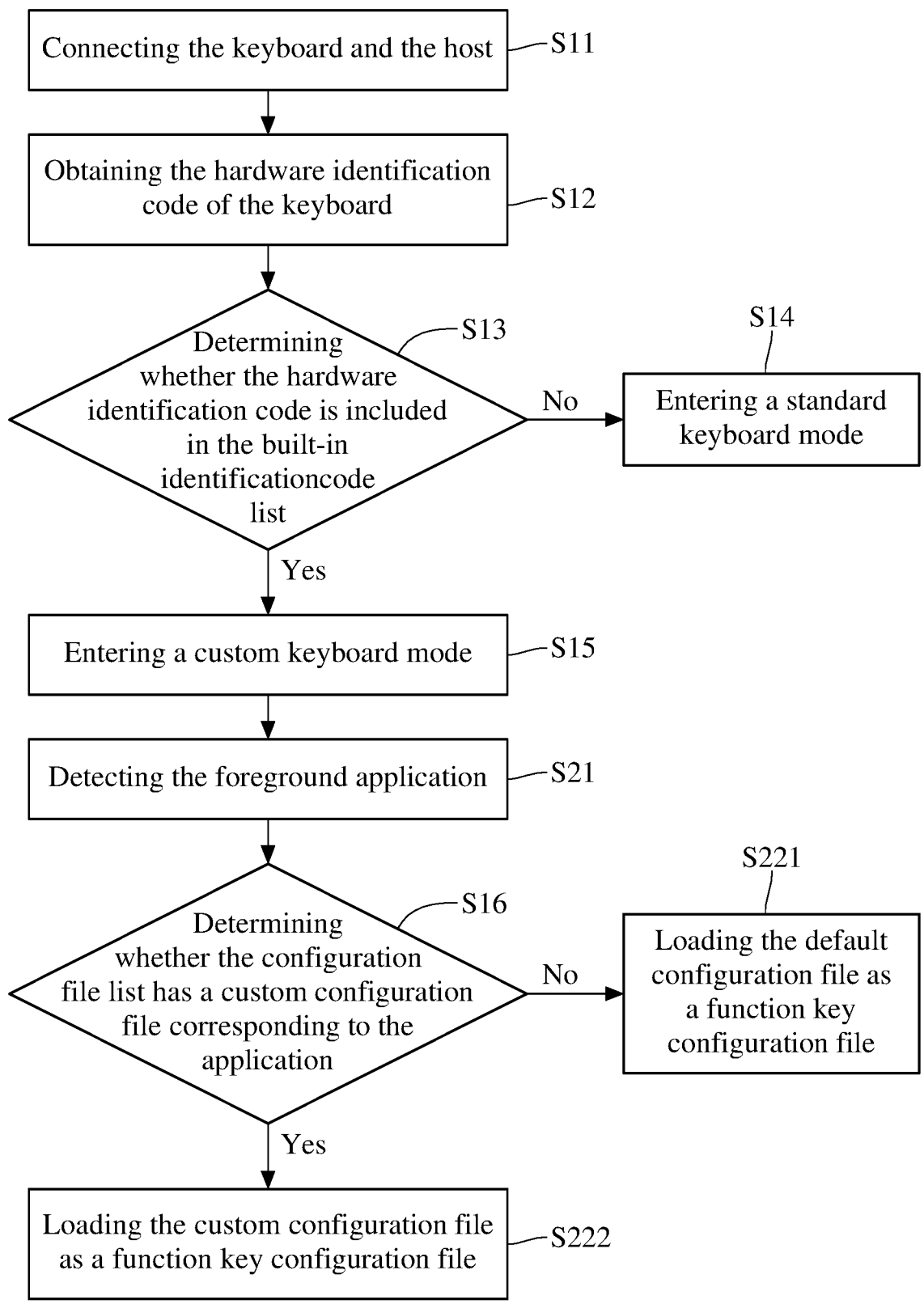
FIG. 1 is a flow chart of detecting keyboard according to an embodiment of the disclosure.

Please refer to FIG. 1, which is a flow chart of detecting a keyboard according to an embodiment of the disclosure. First, please refer to step S11, connecting the keyboard and the host. In detail, the user electrically connects the general keyboard or the designated keyboard to the computer wirelessly or by wire. After the computer is powered on, the startup of the embedded program can be automatic or manual. The former is activated by an embedded program that is launched when the work system is loaded. The latter is activated by a user pressing a specific button on the keyboard (for example, a single button on a designated keyboard or a combination of a plurality of buttons on a general keyboard) or clicking an icon by the mouse to execute the embedded program. In addition, when the embedded program is executed, the user can disable it (do not execute) at any time, or further uninstall the embedded program.

Please refer to step S12, obtaining the hardware identification code of the keyboard. In detail, after the keyboard is connected to the host, the embedded program already running in the operating system automatically detects the hardware identification code of the keyboard. The hardware identification code includes a product ID (PID) and a vendor ID (VID).

Referring to step S13, the embedded program determines whether the hardware identification code is included in the built-in identification code list. In other words, the embedded program confirms whether or not the currently connected keyboard model is supported. In practice, in addition to automatically checking the list of identifiers stored by the embedded program, the user can also select the keyboard model that is electrically connected to the host in the list. Later, when the user purchases an additional new keyboard and connects to the host, the new keyboard can be supported by updating the embedded program.

Please refer to step S14 and step S15 together. If it is confirmed in step S13 that the hardware identification code of the keyboard connected to the host is not present in the identification code list built in the embedded program, the keyboard is regarded as a general standard keyboard and the embedded program enters a standard keyboard mode as shown in step S14, that is, the embedded program loads the configuration file of the commercially available standard keyboard. Conversely, if the hardware identification code of the keyboard currently connected to the host is found from the identification code list in step S13, the keyboard is regarded as a designated keyboard, which supports the subsequent operation of the embedded program. Thus, as shown in step S15, the embedded program enters the custom keyboard mode.

Please refer to step S21, detecting the foreground application. In detail, the foreground application is an application that is being operated by a user in an operating system running after the computer is powered on, and the application is in a foreground window due to user operations. Generally, the operating system (OS) are usually Microsoft's Windows or Apple's Mac OS; however, the type of operating system is not limited to the above. It is additionally noted that after the process of step S13 to step S15 is completed, that is, the embedded program confirms that the list of identification codes of the keyboard currently connected to the host has a hardware identification code, the detection of the foreground application can be started. This means that the embedded program will perform foreground application detection and its subsequent steps only if the specified keyboard supported by the embedded program is connected to the host.

Referring to step S16, it is determined whether the configuration file list has a custom configuration file corresponding to the application detected in step S21. Specifically, in the flow of steps S13 to S15, the embedded program has confirmed that the hardware identification code of the keyboard exists in the identification code list. Next, in step S21, the embedded program confirms the foreground application. Then in step S16, the embedded program searches in the list of configuration files corresponding to the hardware identification code according to the detected application. In practice, a plurality of configuration file lists can be stored in the embedded program, and different configuration file lists correspond to keyboards of different models. At least one configuration file is included in each profile list, one of which is a preset (default) configuration file of the original factory, and the rest is a custom configuration file. The custom profile is, for example, a profile set by the user through the embedded program. The preset configuration file is, for example, a pre-configured (or pre-updated) configuration file in the embedded program, or a configuration file downloaded by the user from the original website in the future. It must be emphasized that each custom profile corresponds to an application that can run on the same computer host, and the default profile can also correspond to an application as a custom profile, or is common to all applications. The application includes a communication software such as Skype, Word, Excel, etc., or a multimedia playback software such as a Potplayer, etc., but the present disclosure does not limit the type of the application.

Please refer to step S221 and step S222 together. If the embedded program confirms that there is only one preset configuration file in the configuration file list without any custom configuration file in step S16, the embedded program loads the default configuration file as a function key configuration file as described in step S221. Otherwise, as described in step S222, the embedded program loads the custom profile as a function key profile.

The function key configuration file stores a plurality of function keys and corresponding operation items of the function keys. For example, the function key configuration file corresponding to the document application "Word" has operation items such as "shrinking font size of selected texts" and "growing font size of selected texts"; and the function key configuration file corresponding to the multimedia play application "Potplayer" has "playing the previous song", "pause" and other functions. Therefore, when the embedded program detects that the foreground application is "Word" in step S21, and finds a custom profile corresponding to the application "Word" in the profile list in step S16, the function key configuration file loaded in step S21 includes the functions of "shrinking font size of selected texts" and "growing font size of selected texts". Similarly, when the current application is a "Potplayer", the loaded configuration file includes the functions of "playing the previous song" and "pause".

Figure 2:
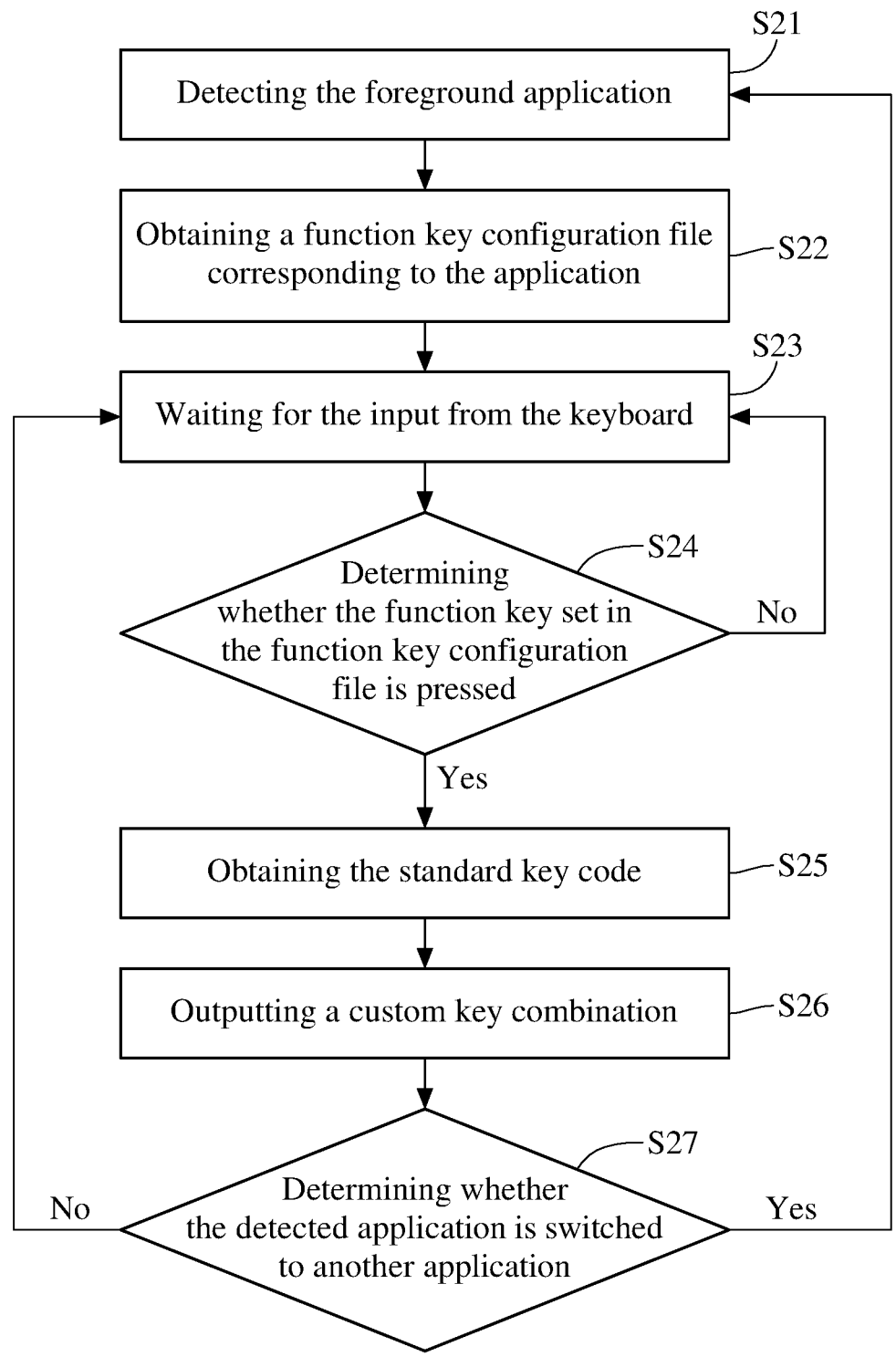
FIG. 2 is a flow chart of adjusting keyboard output signals according to an embodiment of the disclosure.

Please refer to FIG. 2, which is a flow chart of adjusting keyboard output signals according to an embodiment of the disclosure.

Please refer to step S21 to detect the foreground application. This step is an equivalent to step S21 of FIG. 1 and will not be described again here.

Please refer to step S22, obtaining a function key configuration file corresponding to the application. This step corresponds to steps S221 and S222 of FIG. 1. In short, the function key configuration file is a preset configuration file or a custom configuration file. When the configuration file list has a custom configuration file corresponding to the foreground application, the embedded program uses the custom configuration file as the function key configuration file; otherwise, the preset configuration file is used as the function key configuration file.

In another embodiment of the present disclosure, after the function key configuration file corresponding to the foreground application is obtained in step S22, the name of the function key and the corresponding function key combination may be further presented on a display device (e.g., a screen). Specifically, the embedded program can automatically display an assistant panel on the screen. The status window may also appear after detecting a call signal; the sending mode of the call signal is, for example, a user pressing a start button set in solo, a designated button, or a combination button on the keyboard, but there is no limit to this in the present disclosure. In this status window, each function key on the keyboard can be presented according to the currently loaded function key configuration file, and each function key and the corresponding function key configuration file are presented in text, image or logo. The specified action item includes but is not limited to executing shortcuts, applications or hyperlinks, or outputting images, strings, commands, macros, single button signals, or composite button signals. With the design of the status window, the effect of giving the user hints can be achieved. In addition, the status window also allows the user to trigger the corresponding custom key combination by clicking the function key image or the logo. The user can further set or change the content of the function key configuration file through the status window. After the status window appears more than a preset display time, or when the user sends the call signal again, the status window disappears from the screen.

Please refer to step S23 and step S24 together, which are "waiting for the input from the keyboard" and "determining whether the function key set in the function key configuration file is pressed". In detail, the embedded program waits for the input action of the user on the specified keyboard on the premise that the foreground window has not been switched by the user. After detecting the input action, as shown in step S24, the embedded program checks whether the input action is from one of a plurality of function keys on the keyboard. The function keys include but are not limited to the F1 key, F2 key, . . . , F12 key on the keyboard, and the user can also specify a certain key on the keyboard in the custom configuration file (for example, the Scroll Lock key, the Numlock key, Space key . . . etc., or an additional F13 key on a specific keyboard) or a combination of some keys as a new function key. Therefore, in step S24, the embedded program acquires the function keys applicable to the current application according to the function key configuration file loaded in step S22, and detects whether the function keys are pressed.

Please refer to step S25, obtaining the standard key code. Specifically, the embedded program blocks an electronic signal sent from the designated keyboard to the host, and the electronic signal is a standard key code generated by the user pressing a function key. For example, the standard key code of the F1 key is 112, the standard key code of the F2 key is 113, . . . , and the standard key code of the F12 key is 123.

Please refer to step S26, outputting a custom key combination. In detail, the embedded program searches for the standard key code intercepted in step S25 according to the function key configuration file corresponding to the current application obtained in step S22, to obtain the corresponding custom key combination by the function key pressed by the user. The embedded program then sends this custom key combination back to the operating system. In practice, before outputting the custom key combination, it further includes outputting a scan key code. The scan key code is a series of data transmitted by most of the computer keyboards to a computer to report which keys are pressed. For example, the scan key code of the IBM keyboard is "E0" represented by 16 bits. The custom key combination is the control signal of the operation item corresponding to the function key pressed in step S24 in the function key configuration file corresponding to the foreground application. The operation items include, but are not limited to, opening a shortcut, an application or a hyperlink, or outputting an image, a string, an instruction, a macro, a single button signal, or a composite button signal.

Please refer to step S27, determining whether the detected application is switched to another application. In detail, after the step S26 is completed, the embedded program checks whether the foreground window at this time has been switched by the user. If yes, return to step S21 to re-detect the application currently in the foreground window, and then perform the method of dynamically adjusting the keyboard output signal according to the foregoing steps S21 to S26 according to an embodiment of the present disclosure. Conversely, if the user does not switch the currently operating application, the process returns to step S23, and the embedded program waits for the next keyboard input operation, and then executes the method of dynamically adjusting the keyboard output signal according to the flow of steps S23 to S26 according to the embodiment of the present disclosure.

Figure 3:
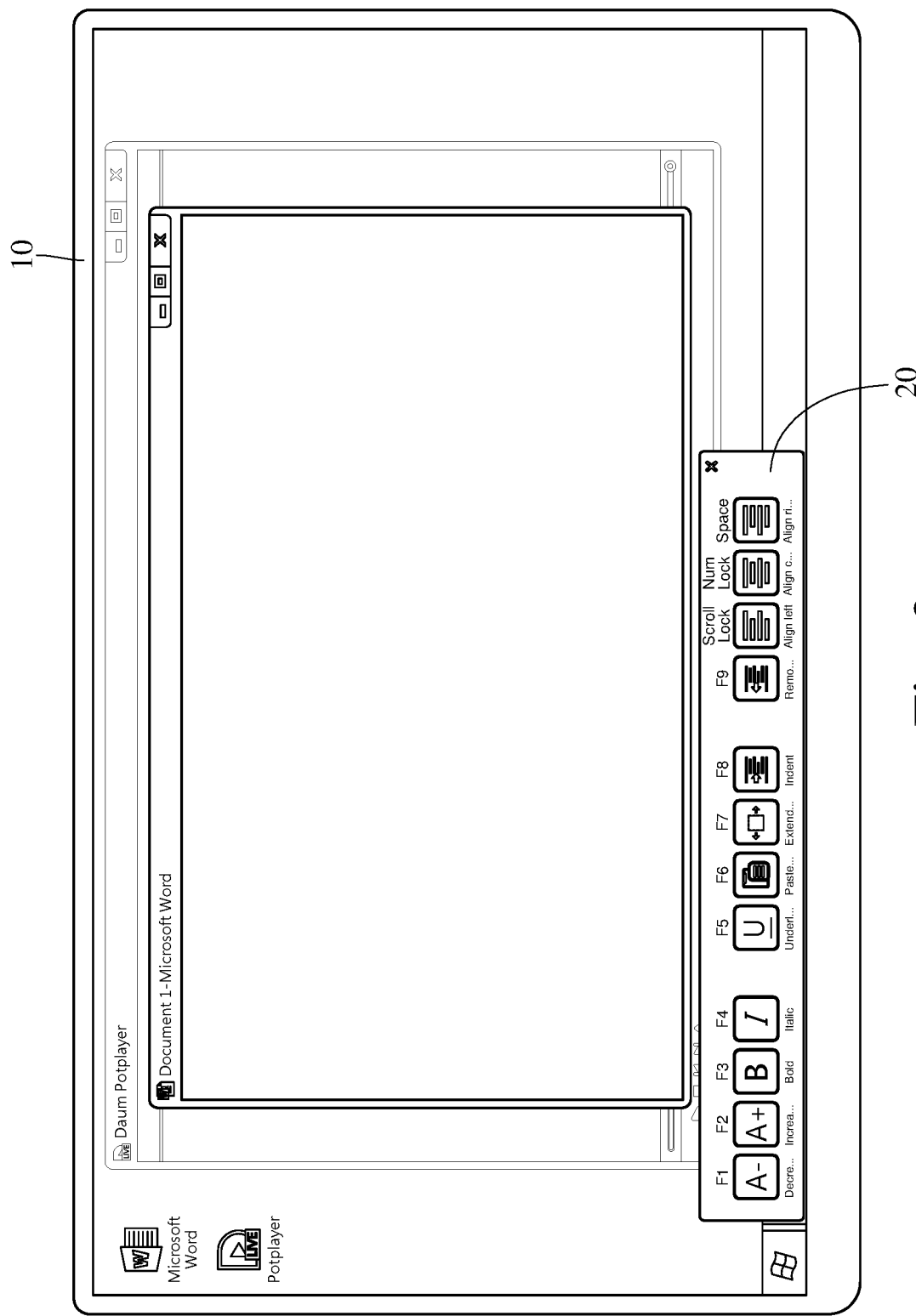
FIG. 3 is a schematic diagram of a window of statement according to an embodiment of the disclosure.
Figure 4:
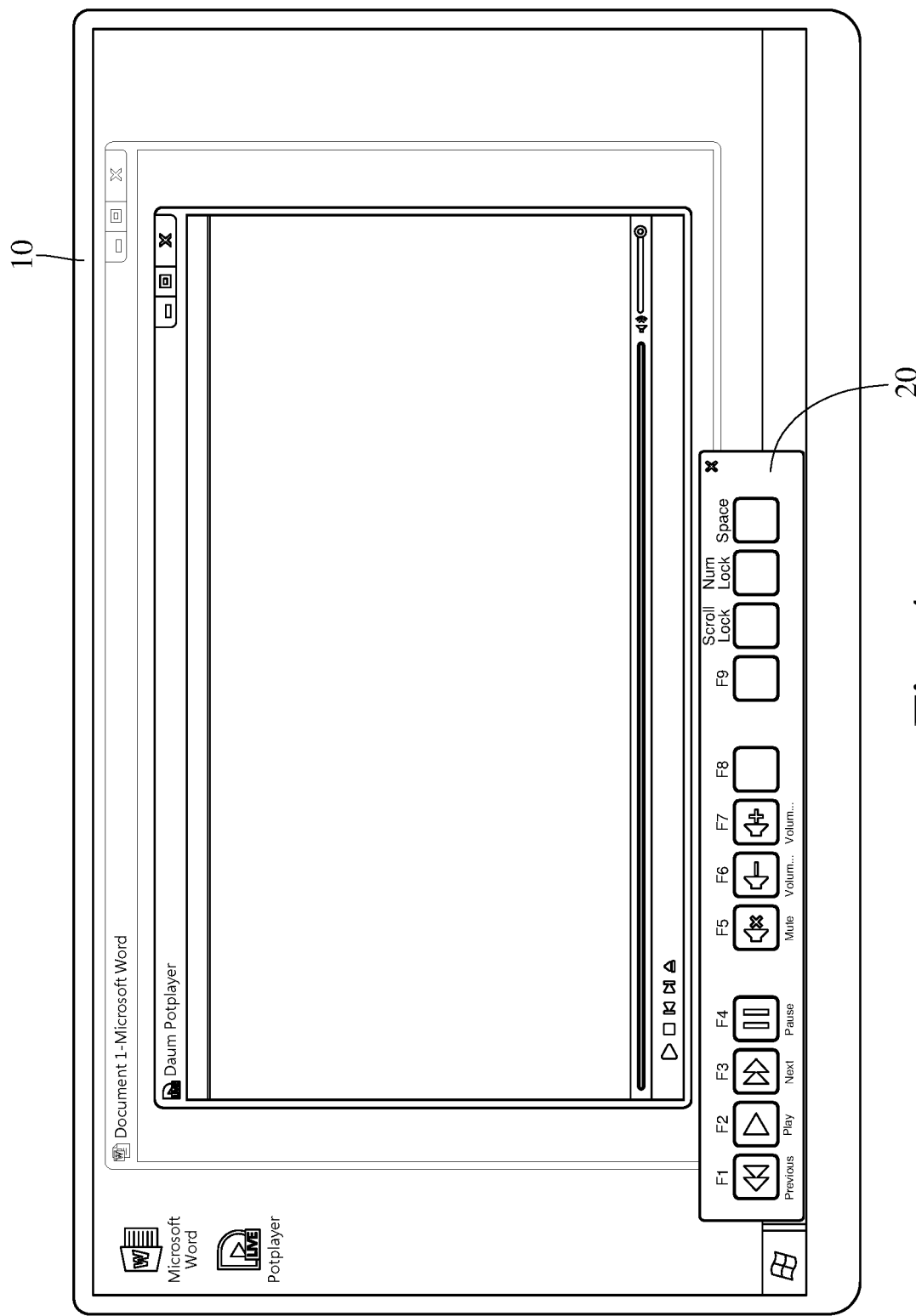
FIG. 4 is a schematic diagram of another window of statement according to an embodiment of the disclosure.

Please refer to FIG. 3 and FIG. 4, which are schematic diagrams showing a state window and another state window of the present disclosure. The status window 20 is presented on the display device 10 by an embedded program. In FIG. 3, the foreground application is "Word" and the background application is "Potplayer", so the status window 20 presents the function key configuration file for "Word". In FIG. 4, the foreground application is "Potplayer" and the background application is "Word", so the status window 20 presents a function key configuration file for "Potplayer".

Please continue to refer to FIG. 3. The embedded program detects that the foreground application is "Word" in step S21. Therefore, the function key configuration file corresponding to "Word" is obtained in step S22, and the status window 20 is presented on the display device 10 (e.g., a screen) to hint the function keys available to the user and their corresponding operating items for current operation of "Word". The embedded program waits for the user's input action on the keyboard in step S23. When the user presses the function key F1 key in step S24, the embedded program will obtain the standard key code (112) of the F1 key in step S25, and after searching the function key configuration file by using the standard key code, the output the custom key code in step S26. The key combination is used to achieve the function of narrowing down the selected text. If it is confirmed in step S27 that the user has not switched away from "Word", the user can press the function key F2 to grow font size of selected texts, or press the Scroll Lock key to achieve the function of aligning the selected text to the left. As mentioned above, please refer to FIG. 4. If the user switches to "Potplayer" in step S27, the user can switch back to the previous song when the F1 key is pressed; when the F2 key is pressed, the function of playing the current song can be obtained. As can be seen from the illustrative examples of FIG. 3 and FIG. 4, in the case where the foreground application is different, the user can press the same function key F1 to reach different quick operation items, and the user can easily be in the status window 20. To know all the available function keys and their corresponding operation items (for example, in the "Potplayer" application shown in FIG. 4, there is no corresponding operation item from F8 key to F12 key, which means that pressing F8 key to F12 key means there will be no action) saves the time that the user has to go through the cumbersome steps to achieve the same function, and to reload the function key configuration file when switching between different applications.

In summary, the method for dynamically adjusting the keyboard output signal of the present disclosure is able to detect the keyboard currently connected to the host through the embedded program. When it is confirmed that the model of the keyboard can be supported, according to the foreground application that the user is operating currently, the function key configuration file corresponding to the keyboard model and the application is loaded, so that the user can press the function key. A custom key combination corresponding to this function key is generated to facilitate the user's quick operation in the application. The present disclosure can automatically switch to the function key configuration files corresponding to these applications according to different applications, so the user does not need to be limited by the number of function keys, and can set his own favorite function key operation items for each application. In addition, the present disclosure also provides a state window design, which can hint the user to use the currently available function key and the corresponding quick operation item after a button press, and let the user click to execute the function key or change the function key configuration file content. The status window will also update the hints as the application switches. In general, the method for dynamically adjusting the keyboard output signal described in the present disclosure can provide more diverse shortcut key customization on the hardware according to different application on the software. The operation thus gives the user a smoother operating experience.

What is claimed is:

1. A method for dynamically adjusting a keyboard output signal, applicable to a host electrically connected to a keyboard, with the method comprising:
    obtaining a hardware identification code of the keyboard;
    confirming whether the hardware identification code exists in an identification code list;
    detecting an application currently running on the host when the hardware identification code exists in the identification code list, wherein the application is in a foreground window;
    obtaining a function key configuration file corresponding to the application;
    determining whether one of a plurality of function keys corresponding to the function key configuration file is pressed;
    blocking a standard key code generated by pressing the function key when the function key of the plurality of function keys corresponding to the function key configuration file is pressed;
    searching for the standard key code according to the function key configuration file to obtain a custom key code combination corresponding to the pressed function key; and
    outputting the custom key code combination to the host according to the standard key code and the function key configuration file,
    wherein the function key comprises at least one of F1 through F12 keys.

2. The method for dynamically adjusting a keyboard output signal according to claim 1, wherein after confirming that the hardware identification code exists in the identification code list, the method further comprises:
    confirming a list of configuration files corresponding to the hardware identification code; and
    confirming whether there is a custom configuration file corresponding to one of the applications in a configuration file list,
    wherein obtaining the function key configuration file corresponding to the application comprises: taking the custom configuration file as the function key configuration file when the custom configuration file corresponding to the application exists in the configuration file list; and taking a default configuration file as the function key configuration file when the custom configuration file corresponding to the application does not exist in the configuration file list.

3. The method for dynamically adjusting a keyboard output signal according to claim 1, wherein the hardware identification code comprises a product identification code and a vendor identification code.

4. The method for dynamically adjusting a keyboard output signal according to claim 1, wherein the function key configuration file comprises a default configuration file and a custom configuration file.

5. The method for dynamically adjusting a keyboard output signal according to claim 1, further comprising outputting a scan key code before outputting a custom key code combination.

6. The method for dynamically adjusting a keyboard output signal according to claim 1, wherein the custom key code combination is adapted to execute a shortcut, an application or a hyperlink, or to output an image, a string, an instruction, a macro, a single button signal, or a composite button signal.

7. The method for dynamically adjusting a keyboard output signal, wherein the function key is a designated button or a combination of a plurality of buttons of the keyboard.

8. A method for dynamically adjusting a keyboard output signal, applicable to a host electrically connected to a keyboard, with the method comprising:
 detecting an application currently running on the host, wherein the application is in a foreground window;
 obtaining a function key configuration file corresponding to the application;
 determining whether one of a plurality of function keys corresponding to the function key configuration file is pressed;
 blocking a standard key code generated by pressing the function key when the function key of the plurality of function keys corresponding to the function key configuration file is pressed;
 searching for the standard key code according to the function key configuration file to obtain a custom key code combination corresponding to the pressed function key;
 outputting the custom key code combination to the host according to the standard key code and the function key configuration file; and
 displaying a name of the function key and the custom key code combination corresponding to the function key onto a display device,
 wherein the function key comprises at least one of F1 through F12 keys.

9. The method for dynamically adjusting a keyboard output signal according to claim 8, wherein the function key is a designated button or a combination of a plurality of buttons of the keyboard.

10. The method for dynamically adjusting a keyboard output signal according to claim 8, wherein the function key configuration file comprises a default configuration file and a custom configuration file.

11. The method for dynamically adjusting a keyboard output signal according to claim 8, further comprising outputting a scan key code before outputting a custom key code combination.

12. The method for dynamically adjusting a keyboard output signal according to claim 8, wherein the custom key code combination is adapted to execute a shortcut, an application or a hyperlink, or to output an image, a string, an instruction, a macro, a single button signal, or a composite button signal.

* * * * *